United States Patent
Tomosue et al.

(10) Patent No.: US 9,759,112 B2
(45) Date of Patent: Sep. 12, 2017

(54) RETAINER FOR GAS PROCESSING DEVICE, GAS PROCESSING DEVICE, AND MANUFACTURING METHODS THEREFOR

(75) Inventors: Nobuya Tomosue, Tokyo (JP); Hiroki Nakamura, Tokyo (JP); Tadashi Sakane, Tokyo (JP)

(73) Assignee: Nichias Corporation, Tokyo (JP)

( * ) Notice: Subject to any disclaimer, the term of this patent is extended or adjusted under 35 U.S.C. 154(b) by 692 days.

(21) Appl. No.: 14/237,295

(22) PCT Filed: Jul. 19, 2012

(86) PCT No.: PCT/JP2012/068396
§ 371 (c)(1),
(2), (4) Date: May 1, 2014

(87) PCT Pub. No.: WO2013/021800
PCT Pub. Date: Feb. 14, 2013

(65) Prior Publication Data
US 2014/0248189 A1 Sep. 4, 2014

(30) Foreign Application Priority Data
Aug. 5, 2011 (JP) .................... 2011-172137

(51) Int. Cl.
F01N 3/28 (2006.01)
F01N 13/16 (2010.01)
(Continued)

(52) U.S. Cl.
CPC ........... F01N 3/2871 (2013.01); B01D 53/94 (2013.01); F01N 3/0211 (2013.01);
(Continued)

(58) Field of Classification Search
None
See application file for complete search history.

(56) References Cited

U.S. PATENT DOCUMENTS 3,507,357 A 4/1970 Blome
7,197,936 B2 4/2007 Baba
(Continued)

FOREIGN PATENT DOCUMENTS

GB 2447959 A 10/2008
GB WO 2010122337 A1 * 10/2010 ............ F01N 3/0211
(Continued)

OTHER PUBLICATIONS

Dow Corning. Silicone Rubber Chemistry and Properties. Silicones Simplified. Xiameter from Dow Corning. 2001. https://www.xiameter.com/en/ExploreSilicones/ProductTypes/Silicone_Rubber/Pages/Rubber-Chemistry.aspx.*
(Continued)

*Primary Examiner* — Walter D Griffin
*Assistant Examiner* — Jelitza Perez
(74) *Attorney, Agent, or Firm* — Steptoe & Johnson LLP

(57) ABSTRACT

A gas processing device is disclosed that makes it possible to appropriately control the frictional resistance between a holding mat and a casing. A gas processing device (1) includes a processing structure (20), a casing (40) made of a metal and housing the processing structure (20), and a holding mat (10) formed of inorganic fibers and placed between the processing structure (20) and the casing (40), an inner surface (41) of the casing (40) and an outer surface (11) of the holding mat (10) coming in contact with each other through an adhesive layer (12) that includes a com-
(Continued)

pound that includes a structural unit represented by a general formula (I).

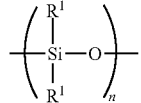

wherein $R^1$ are independently a hydrogen atom, an alkyl group having 1 to 5 carbon atoms, an alkoxy group having 1 to 5 carbon atoms, a phenyl group, or a hydroxyl group, and n is an integer equal to or larger than 1.

8 Claims, 8 Drawing Sheets

(51) Int. Cl.
*B01D 53/94* (2006.01)
*F01N 3/021* (2006.01)

(52) U.S. Cl.
CPC ........... *F01N 3/2853* (2013.01); *F01N 13/16* (2013.01); *F01N 2330/06* (2013.01); *F01N 2350/02* (2013.01); *F01N 2450/02* (2013.01); *F01N 2450/28* (2013.01); *Y02T 10/20* (2013.01); *Y10T 29/49345* (2015.01)

(56) References Cited

U.S. PATENT DOCUMENTS

| | | | |
|---|---|---|---|
| 7,854,905 | B2 | 12/2010 | Yasuda et al. |
| 2009/0041967 | A1 | 2/2009 | Tomosue et al. |
| 2010/0150791 | A1* | 6/2010 | Kunze ................... C04B 41/009 422/179 |
| 2010/0207298 | A1 | 8/2010 | Kunze et al. |

FOREIGN PATENT DOCUMENTS

| | | | |
|---|---|---|---|
| JP | 63-28425 | 2/1988 | |
| JP | 7-11245 | 2/1995 | |
| JP | 2005-156307 | 6/2005 | |
| JP | 2009-508044 | 2/2009 | |
| JP | 2011-102557 | 5/2011 | |
| WO | WO 2010/122337 A1 | 10/2010 | |
| WO | WO 2010122337 A1 * | 10/2010 | ............ F01N 3/0211 |

OTHER PUBLICATIONS

Dow Corning. An Overview of Polydimethylsiloxane (PDMS) Fluids in the Environment. Silicones Simplified. Xiameter by Dow Corning. 2009, pp. 1-4. https://www.xiameter.com/en/ExploreSilicones/Documents/95-725-01%20Overview%20of%20Polydimethylsiloxane%20Fluids.pdf.*
International Preliminary Report on Patentability and Written Opinion of the Searching Authority, dated Feb. 11, 2014, issued in Int'l Appl. No. PCT/JP2012/068396.

* cited by examiner

|  | Basis weight (g/cm$^2$) | Application amount (g) (SiO$_2$ basis) | Bulk density (g/cm$^3$) | Insertion force (N) | Ordinary-state pushing force (N) | Post-heating pushing force (N) |
|---|---|---|---|---|---|---|
| Comparative Example 2 | 813 | 0.00 | 0.21 | 616 | 509 | 757 |
|  | 1107 | 0.00 | 0.28 | 1369 | 991 | 1566 |
|  | 1270 | 0.00 | 0.32 | 1538 | 953 | 1706 |
|  | 1372 | 0.00 | 0.34 | 1923 | 1192 | 2017 |
|  | 1500 | 0.00 | 0.38 | 2425 | 1485 | 2631 |
|  | 1501 | 0.00 | 0.38 | 2455 | 1525 | 2625 |
| Example 2 | 803 | 0.29 | 0.21 | 638 | 546 | 909 |
|  | 840 | 0.30 | 0.22 | 666 | 596 | 973 |
|  | 1100 | 0.43 | 0.28 | 1248 | 1029 | 1766 |
|  | 1109 | 0.37 | 0.29 | 1451 | 1124 | 2002 |
|  | 1321 | 0.32 | 0.33 | 1920 | 1300 | 2296 |
|  | 1353 | 0.33 | 0.34 | 2128 | 1481 | 3417 |

FIG.17a
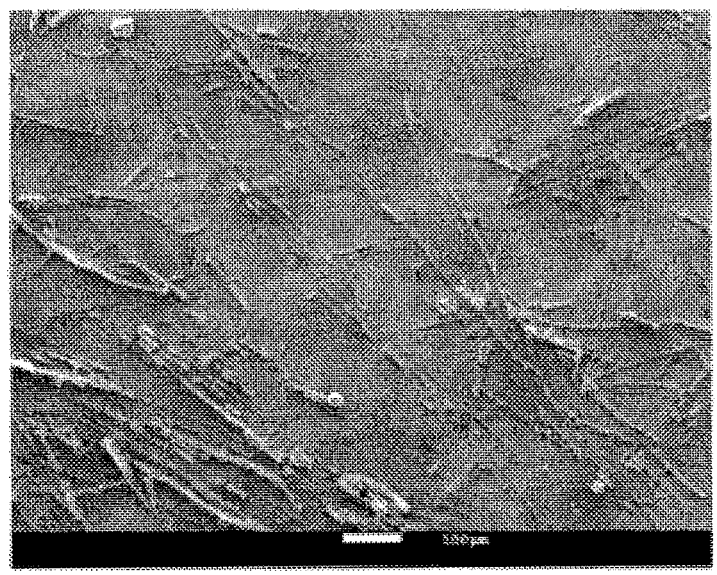
FIG.17b
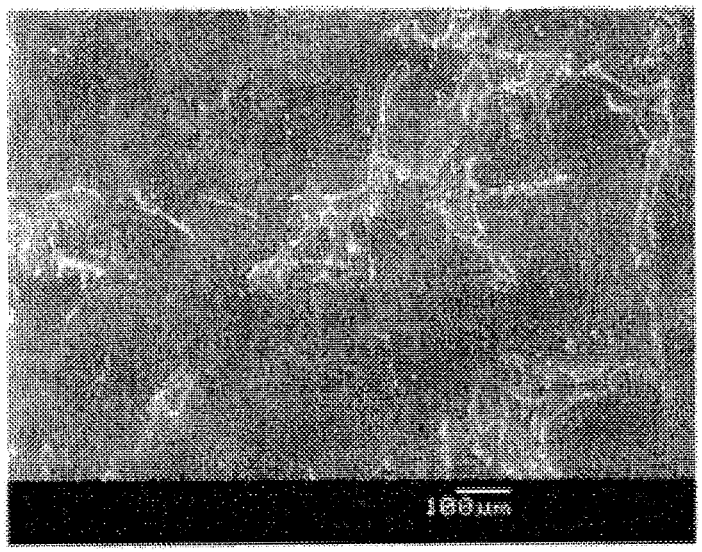
FIG.18
|  | Coefficient of static friction | |
| --- | --- | --- |
|  | Before heating | After heating |
| Comparative Example 3 | 0.21 | 0.57 |
| Example 3-1 | 0.23 | 1.02 |
| Example 3-2 | 0.24 | 0.81 |

RETAINER FOR GAS PROCESSING DEVICE, GAS PROCESSING DEVICE, AND MANUFACTURING METHODS THEREFOR

This application is a national stage entry of International Application No. PCT/JP2012/068396, filed Jul. 19, 2012, designating the U.S., and which claims the benefit of Japanese Application No. 2011-172137, filed Aug. 5, 2011.

TECHNICAL FIELD

The invention relates to a gas processing device holding mat, a gas processing device, and methods for producing the same. In particular, the invention relates to control of the frictional resistance between a holding mat and a casing.

BACKGROUND ART

A catalytic converter for removing a toxic substance (e.g., carbon monoxide, hydrocarbon, and nitrogen oxide) contained in exhaust gas may be provided in a vehicle (e.g., automobile). The catalytic converter may include a tubular catalyst carrier, a tubular metal casing that houses the catalyst carrier, and a mat-like inorganic fiber holding mat that is disposed between the catalyst carrier and the casing, for example. It is necessary to prevent removal of the catalyst carrier from the casing in such a catalytic converter.

For example, Patent Document 1 discloses a technique that forms a friction layer including inorganic colloidal particles (e.g., colloidal silica) on the holding mat.

RELATED-ART DOCUMENT

Patent Document

Patent Document 1: JP-T-2009-508044

SUMMARY OF THE INVENTION

Technical Problem

According to the above technique, however, the frictional resistance between the holding mat and the casing significantly increases due to the friction layer formed in advance when inserting the catalyst carrier (around which the holding mat is wound) into the casing (i.e., during canning), and the operability is impaired.

The invention was conceived in view of the above problem. An object of the invention is to provide a gas processing device holding mat, a gas processing device, and methods for producing the same that make it possible to appropriately control the frictional resistance between a holding mat and a casing.

Solution to Problem

According to one aspect of the invention, a gas processing device includes a processing structure, a casing that is made of a metal and houses the processing structure, and a holding mat that is formed of inorganic fibers and placed between the processing structure and the casing, an inner surface of the casing and an outer surface of the holding mat coming in contact with each other through an adhesive layer that includes a compound that includes a structural unit represented by the following general formula (I). The invention thus provides a gas processing device that makes it possible to appropriately control the frictional resistance between the holding mat and the casing.

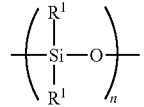

wherein $R^1$ are independently a hydrogen atom, an alkyl group having 1 to 5 carbon atoms, an alkoxy group having 1 to 5 carbon atoms, a phenyl group, or a hydroxyl group, and n is an integer equal to or larger than 1.

In the gas processing device, the inner surface of the casing and the outer surface of the holding mat may be bonded to each other through the adhesive layer that has been cured. In the gas processing device, the inner surface of the casing and the outer surface of the holding mat may be bonded to each other via an anchor effect through the adhesive layer. In the gas processing device, the inner surface of the casing and the outer surface of the holding mat may be bonded to each other so that pieces of the inorganic fibers that form the holding mat remain on the inner surface of the casing in a bonded state when the casing and the holding mat are separated from each other.

The compound I may be a compound represented by the following general formula (II). In this case, the adhesive layer may include the compound represented by the general formula (II) wherein at least one $R^2$ is a hydrogen atom to form a hydroxyl group, and a capping compound that protects the hydroxyl group. The compound may be a silicone oil.

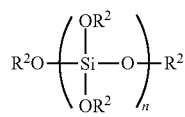

wherein $R^2$ are independently a hydrogen atom or an alkyl group having 1 to 5 carbon atoms, and n is an integer equal to or larger than 1.

According to another aspect of the invention, a gas processing device holding mat is formed of inorganic fibers, and placed between a processing structure and a casing that are provided in a gas processing device, the casing being made of a metal and housing the processing structure, the gas processing device holding mat having an outer surface that comes in contact with an inner surface of the casing, and an adhesive layer being formed on at least part of the outer surface, the adhesive layer including a compound that includes a structural unit represented by the general formula (I). The invention thus provides a gas processing device holding mat that makes it possible to appropriately control the frictional resistance between the holding mat and the casing.

According to another aspect of the invention, a method for producing a gas processing device that includes a processing structure, a casing that is made of a metal and houses the processing structure, and a holding mat that is formed of inorganic fibers and placed between the processing structure and the casing, includes: a placement step that places the holding mat between the processing structure and the casing so that an inner surface of the casing and an outer surface of the holding mat come in contact with each other through an adhesive layer that includes a compound that includes a structural unit represented by the general formula (I). The invention thus provides a method for producing a gas processing device that makes it possible to appropriately control the frictional resistance between the holding mat and the casing.

The placement step may place the holding mat that has the outer surface on which the adhesive layer is formed in advance, between the processing structure and the casing. The placement step may place the holding mat between the processing structure and the casing that has the inner surface on which the adhesive layer is formed in advance.

The method for producing a gas processing device may further include a bonding step that heats and cures the adhesive layer in a state in which the inner surface of the casing and the outer surface of the holding mat come in contact with each other through the adhesive layer to bond the inner surface and the outer surface.

According to another aspect of the invention, a method for producing a gas processing device holding mat that is formed of inorganic fibers, and placed between a processing structure and a casing that are provided in a gas processing device, the casing being made of a metal and housing the processing structure, includes forming an adhesive layer on at least part of an outer surface of the holding mat that comes in contact with an inner surface of the casing, the adhesive layer including a compound that includes a structural unit represented by the general formula (I). The invention thus provides a method for producing a gas processing device holding mat that makes it possible to appropriately control the frictional resistance between the holding mat and the casing.

Advantageous Effects of the Invention

The invention thus provides a gas processing device holding mat, a gas processing device, and methods for producing the same that make it possible to appropriately control the frictional resistance between the holding mat and the casing.

BRIEF DESCRIPTION OF DRAWINGS

FIG. 17A is a view illustrating an example of the observation results when observing the inner surface of a casing separated from a holding mat using a scanning electron microscope when ethyl silicate was applied in Example 2.

FIG. 17B is a view illustrating an example of the observation results when observing the inner surface of a casing separated from a holding mat using a scanning electron microscope when colloidal silica was used in Example 2.

FIG. 18 is a view illustrating an example of the coefficient of static friction evaluation results obtained in Example 3.

DESCRIPTION OF EMBODIMENTS

Exemplary embodiments of the invention are described below. Note that the invention is not limited to the following exemplary embodiments.

Figure 1:
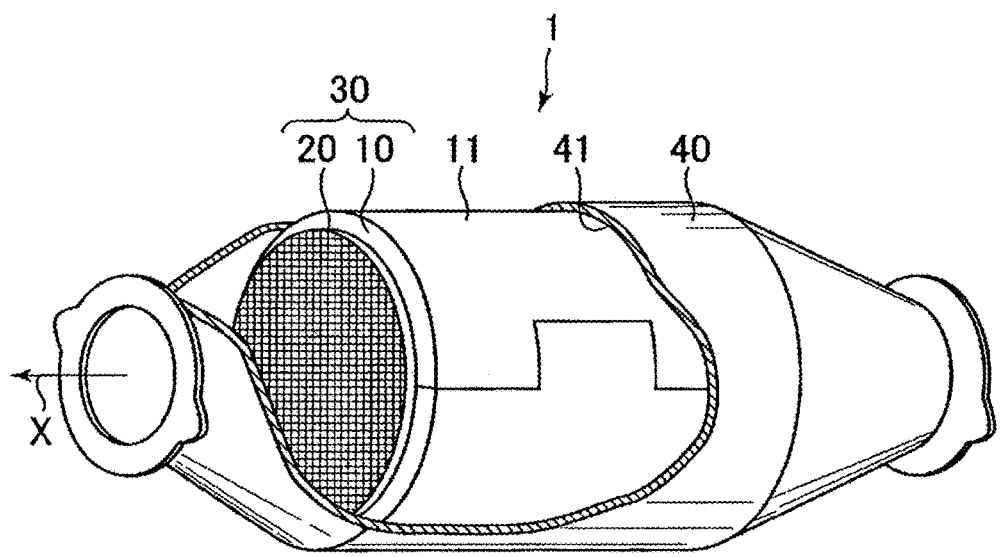
FIG. 1 is a view illustrating an example of a gas processing device according to one embodiment of the invention.

FIG. 1 is a view illustrating an example of a gas processing device 1 according to one embodiment of the invention. In FIG. 1, part of a casing 40 is omitted, and a processing structure 20 and a holding mat 10 contained in the casing 40 are exposed for convenience of explanation.

Figure 2:
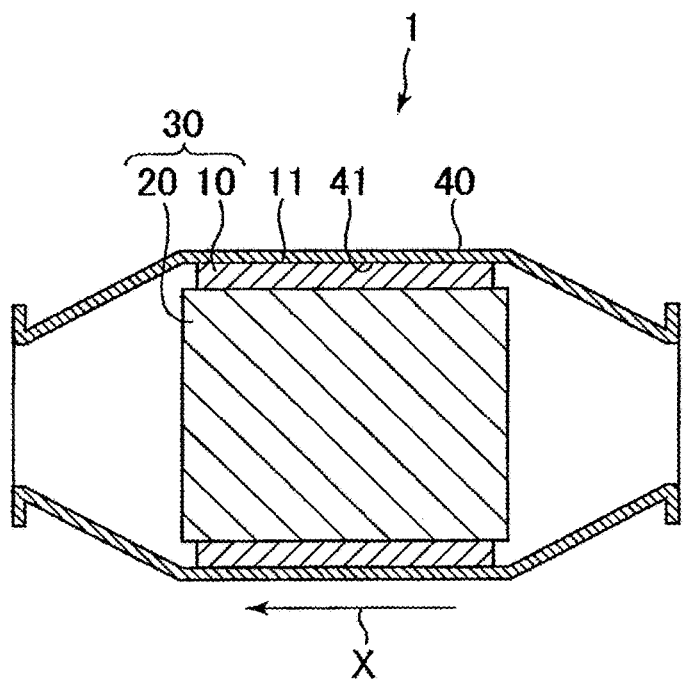
FIG. 2 is a view illustrating an example of the cross section of a gas processing device according to one embodiment of the invention along the longitudinal direction.
Figure 3:
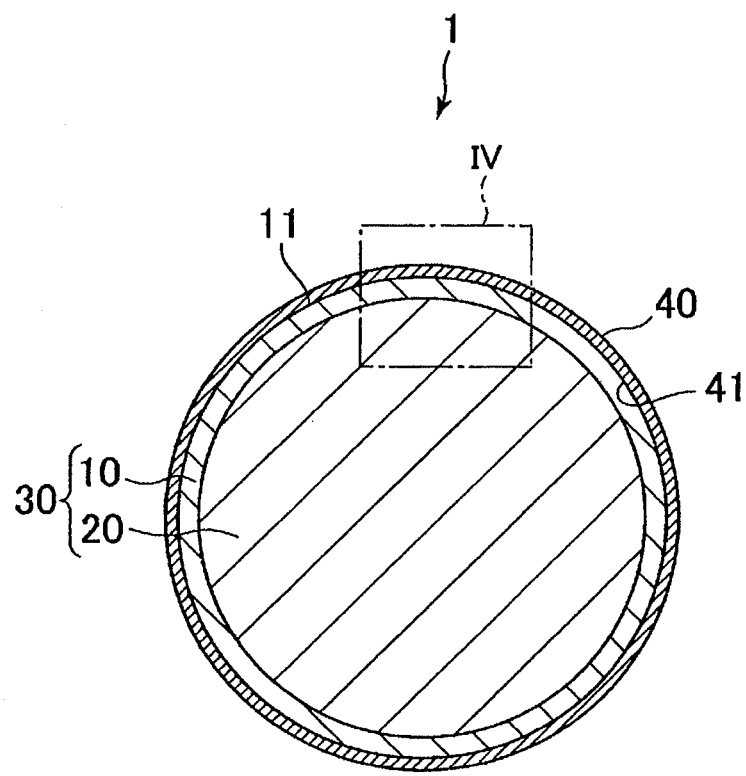
FIG. 3 is a view illustrating an example of the cross section of a gas processing device according to one embodiment of the invention along the direction orthogonal to the longitudinal direction.
Figure 4:
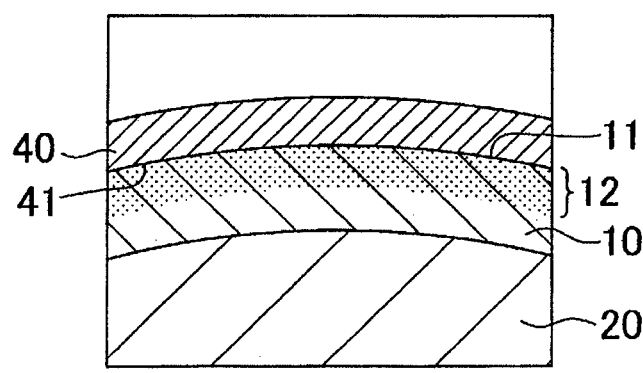
FIG. 4 is an enlarged view illustrating part of the gas processing device enclosed by the alternate long and short dash line IV illustrated in FIG. 3.

FIG. 2 is a view illustrating an example of the cross section of the gas processing device 1 along the longitudinal direction (i.e., the direction indicated by the arrow X in FIGS. 1 and 2). In FIGS. 1 and 2, the arrow X indicates the direction in which gas passes through the gas processing device 1. FIG. 3 is a view illustrating an example of the cross section of the gas processing device 1 along the direction orthogonal to the longitudinal direction. FIG. 4 is an enlarged view illustrating part of the gas processing device 1 enclosed by the alternate long and short dash line IV illustrated in FIG. 3.

Figure 5:
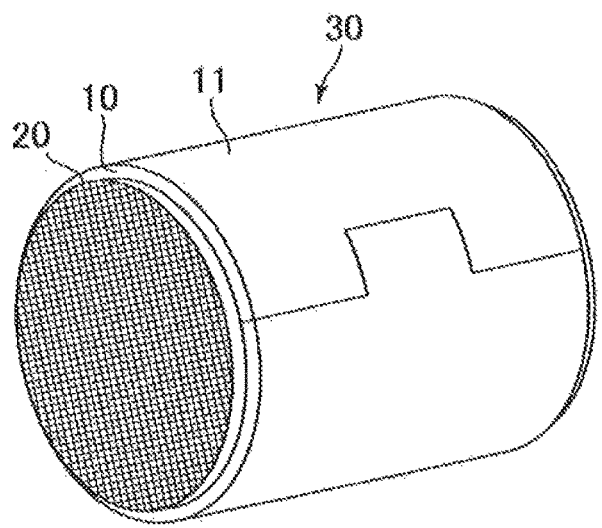
FIG. 5 is a view illustrating an example of an assembly according to one embodiment of the invention.
Figure 6:
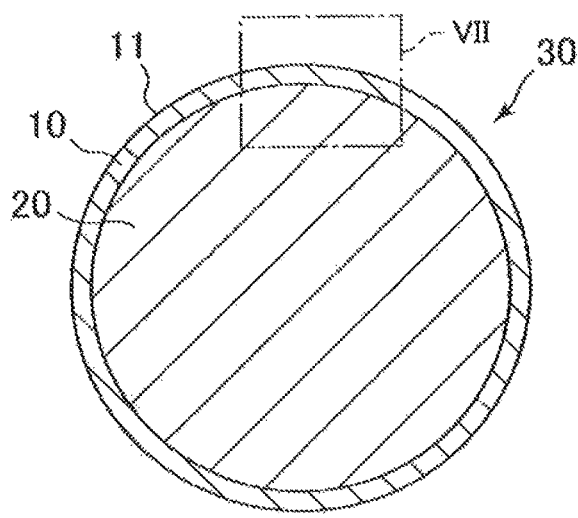
FIG. 6 is a view illustrating an example of the cross section of an assembly according to one embodiment of the invention along the direction orthogonal to the longitudinal direction.
Figure 7:
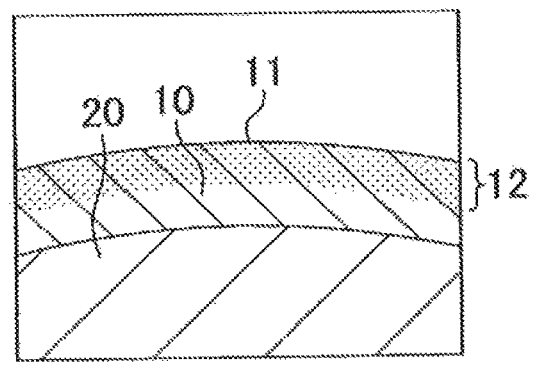
FIG. 7 is an enlarged view illustrating part of the assembly enclosed by the alternate long and short dash line VII illustrated in FIG. 6.

FIG. 5 is a view illustrating an example of an assembly 30 that includes the processing structure 20 and the holding mat 10. FIG. 6 is a view illustrating an example of the cross section of the assembly 30 along the direction orthogonal to the longitudinal direction of the gas processing device 1. FIG. 7 is an enlarged view illustrating part of the assembly 30 enclosed by the alternate long and short dash line VII illustrated in FIG. 6.

Figure 8:
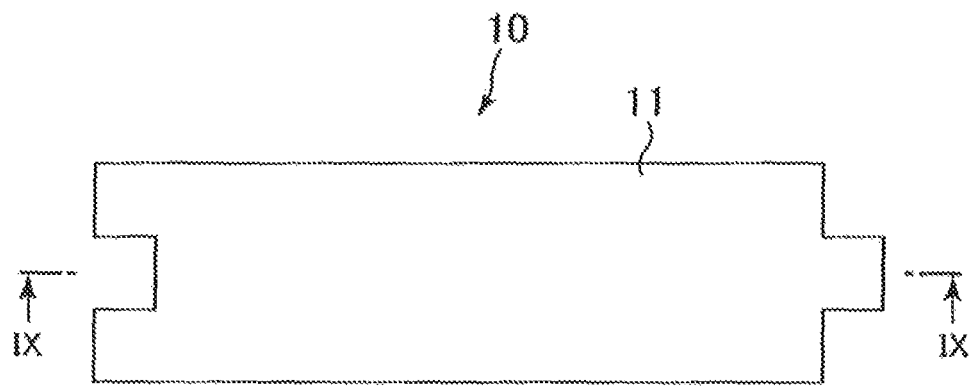
FIG. 8 is a plan view illustrating an example of a holding mat according to one embodiment of the invention.
Figure 9:
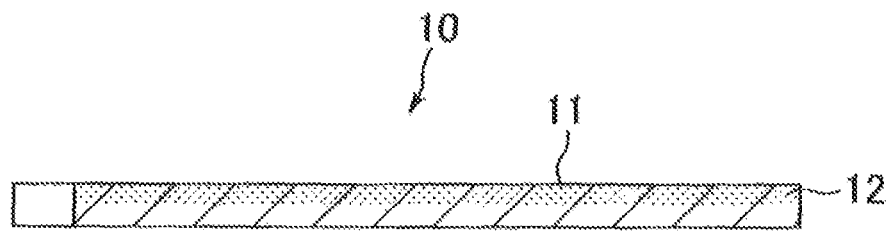
FIG. 9 is a view illustrating an example of the cross section of the holding mat along the line IX-IX illustrated in FIG. 8.
Figure 10:
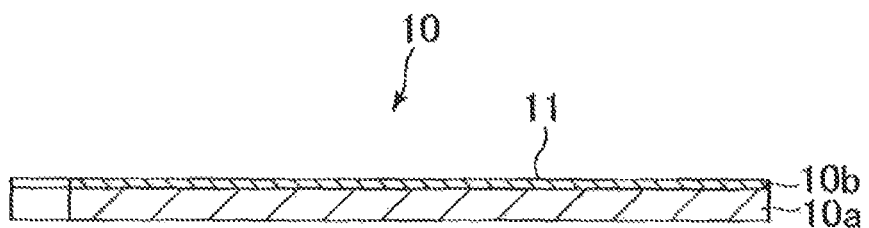
FIG. 10 is a view illustrating another example of the cross section of the holding mat along the line IX-IX illustrated in FIG. 8.

FIG. 8 is a plan view illustrating an example of the holding mat 10 (gas processing device holding mat) according to one embodiment of the invention. FIG. 9 is a view illustrating an example of the cross section of the holding mat 10 along the line IX-IX illustrated in FIG. 8. FIG. 10 is a view illustrating another example of the cross section of the holding mat 10 along the line IX-IX illustrated in FIG. 8.

As illustrated in FIGS. 1 to 3, the gas processing device 1 includes the processing structure 20, the casing 40 that is made of a metal and houses the processing structure 20, and the holding mat 10 that is formed of inorganic fibers and placed between the processing structure 20 and the casing 40.

The gas processing device 1 is used to process (e.g., purify) gas. For example, the gas processing device 1 is an exhaust gas processing device used to purify exhaust gas. For example, the gas processing device 1 is provided in a vehicle (e.g., automobile) in order to process a toxic substance and/or particles contained in exhaust gas discharged from an internal combustion engine (e.g., gasoline engine or diesel engine). The temperature of gas that is passed through the gas processing device 1 is not particularly limited, but may be 200 to 900° C., for example. The gas processing device 1 according to the example illustrated in FIGS. 1 to 4 is a catalytic converter that is provided in a vehicle (e.g., automobile) and used to remove a toxic substance contained in exhaust gas. Note that the gas processing device 1 may be a diesel particulate filter (DPF) that is used to remove particles contained in exhaust gas discharged from a diesel engine, for example.

The processing structure 20 is a structure having a gas processing function. Specifically, when the gas processing device 1 is a catalytic converter (see FIGS. 1 to 4), the processing structure 20 is a catalyst carrier that includes a catalyst for purifying gas, and a carrier that supports the catalyst. For example, the catalyst is a catalyst for removing a toxic substance (e.g., carbon monoxide, hydrocarbon, and nitrogen oxide) contained in gas (e.g., exhaust gas). For example, the catalyst is a metal catalyst such as a noble metal catalyst. The carrier that supports the catalyst is a tubular formed body (e.g., cylindrical honeycomb formed body) made of a ceramic (e.g., cordierite), for example. When the gas processing device 1 is a device (e.g., DPF) that is used to remove particles contained in gas, the processing structure 20 need not necessarily include a catalyst, but may include a filter that traps particles contained in gas, for example.

The casing 40 is a tubular body that is made of a metal, and has an inner space that can house the processing structure 20. The metal that forms the casing 40 is not particularly limited. For example, the metal that forms the casing 40 is selected from the group consisting of stainless steel, iron, and aluminum.

The casing 40 may be a tubular body that can be divided into two pieces along the longitudinal direction (i.e., the direction indicated by the arrow X in FIGS. 1 and 2) of the gas processing device 1, or may be an integral tubular body that cannot be divided, for example. In one embodiment of the invention, the casing 40 is an integral tubular body.

The holding mat 10 is used to retain the processing structure 20 inside the casing 40. Specifically, the holding mat 10 is press-fit into the gap between the casing 40 and the processing structure 20 to stably retain the processing structure 20 inside the casing 40.

The holding mat 10 is required to have a function of stably retaining the processing structure 20 in the gas processing device 1 so as to prevent a situation in which the processing structure 20 collides with the casing 40, and breaks due to vibrations or the like, and a function of sealing the gap between the processing structure 20 and the casing 40 so as to prevent leakage of unpurified gas from gap between the processing structure 20 and the casing 40. The holding mat 10 is used for the gas processing device 1 that is provided in a vehicle (e.g., automobile) in order to process a toxic substance contained in exhaust gas discharged from an internal combustion engine. For example, the holding mat 10 may be used in a relatively high-temperature environment (e.g., gasoline engine), or may be used in a relatively low-temperature environment (e.g., diesel engine). When a high-temperature (e.g., 200 to 900° C.) gas is passed through the gas processing device 1, it is preferable that the holding mat 10 exhibit heat resistance and a heat insulation capability.

The holding mat 10 is formed of inorganic fibers. Specifically, the holding mat 10 is a formed body that includes inorganic fibers as the main component. For example, the holding mat 10 is a formed body that has an inorganic fiber content of 90 mass % or more.

The inorganic fibers are not particularly limited as long as the inorganic fibers do not deteriorate, or deteriorate to only a small extent, when used for the gas processing device 1. The inorganic fibers are preferably one or more types of inorganic fibers selected from the group consisting of alumina fibers, mullite fibers, aluminosilicate fibers, silica fibers, soluble inorganic fibers, glass fibers, and rock wool.

The alumina fibers are polycrystalline fibers that include alumina ($Al_2O_3$) as the main component. It is preferable that the alumina fibers have an alumina content of 90 mass % or more, for example.

The mullite fibers are polycrystalline fibers that include alumina ($Al_2O_3$) and silica ($SiO_2$) as the main components. It is preferable that the mullite fibers have a total content of alumina ($Al_2O_3$) and silica ($SiO_2$) of 90 mass % or more, for example. The mass ratio "alumina ($Al_2O_3$)/silica ($SiO_2$)" in the mullite fibers is preferably 70/30 to 85/15.

The aluminosilicate fibers are amorphous fibers that include alumina ($Al_2O_3$) and silica ($SiO_2$) as the main components. The mass ratio "alumina ($Al_2O_3$)/silica ($SiO_2$)" in the aluminosilicate fibers may be 60/40 to 40/60, for example.

The silica fibers are amorphous fibers or polycrystalline fibers that include silica ($SiO_2$) as the main component. It have is preferable that the silica fibers a silica ($SiO_2$) content of 90 mass % or more, for example.

The soluble inorganic fibers are artificial amorphous inorganic fibers that are provided with biosolubility. The soluble inorganic fibers are not particularly limited as long as the soluble inorganic fibers exhibit biosolubility (biodegradability). For example, the soluble inorganic fibers are preferably inorganic fibers having a physiological saline dissolution ratio at 40° C. of 1% or more, and a thermal shrinkage ratio of 5% or less when heated at 1000° C. for 8 hours.

The physiological saline dissolution ratio of the soluble inorganic fibers is measured as described below, for example. Specifically, a conical flask (volume: 300 ml) is charged with 1 g of a sample prepared by grinding the soluble inorganic fibers to a dimension of 200 mesh or less, and 150 ml of physiological saline, and placed in an incubator at 40° C. Horizontal vibrations are applied to the conical flask at 120 rpm for 50 hours, followed by filtration. The elements included in the filtrate are quantitatively determined using an ICP optical emission spectrometer. The solubility that indicates the ratio of the content of elements eluted from the sample into the filtrate (i.e., the weight loss percentage of the sample due to dissolution) is calculated based on the quantitative content of the elements, and the composition and the weight of the sample.

The glass fibers are prepared by melting and drawing non-alkali glass such as quartz glass. The glass fibers are also referred to as glass wool. A short glass fiber or a continuous glass fiber (long glass fiber) may be used as the glass fibers. Specific examples of the glass fibers include E-glass fibers that include 52 to 56 mass % of $SiO_2$, 12 to 16 mass % of $Al_2O_3$, 0 to 5 mass % of MgO, 16 to 25 mass % of CaO, 5 to 10 mass % of $B_2O_3$, 0 to 1 mass % of $Na_2O$ and/or $K_2O$, and 0 to 1 mass % of $TiO_2$, T-glass fibers that include 62 to 65 mass % of $SiO_2$, 20 to 25 mass % of $Al_2O_3$, 10 to 15 mass % of MgO, 0 to 1 mass % of CaO, 0 to 1 mass % of $B_2O_3$, 0 to 1 mass % of $Na_2O$ and/or $K_2O$, and 0 to 1 mass % of $TiO_2$, and NCR-glass fibers that include 56 to 62 mass % of $SiO_2$, 9 to 15 mass % of $Al_2O_3$, 0 to 5 mass % of MgO, 17 to 25 mass % of CaO, 0 to 1 mass % of $B_2O_3$, 0 to 1 mass % of $Na_2O$ and/or $K_2O$, and 0 to 4 mass % of $TiO_2$.

The rock wool consists of artificial mineral fibers that include silicon dioxide ($SiO_2$) and calcium oxide (CaO) as the main components. The rock wool is produced by mixing lime or the like with basalt, iron furnace slag, or the like, and melting the mixture at a high temperature. The rock wool is a fibrous product that normally includes 35 to 45 mass % of $SiO_2$, 10 to 20 mass % of $Al_2O_3$, 4 to 8 mass % of MgO, 20 to 40 mass % of CaO, 0 to 10 mass % of $Fe_2O_3$, and 0 to 4 mass % of MnO. Note that the composition varies depending on the raw materials.

The inorganic fibers (e.g., silica fibers or aluminosilicate fibers) may be heated (calcined) in advance. The heat resistance of the inorganic fibers can be improved by heating the inorganic fibers in advance. For example, silica fibers may be produced by subjecting glass fibers to an acid treatment to remove the alkaline component and increase the silica content. When the silica fibers subjected to the acid treatment are heated in advance, fine voids formed by the acid treatment performed during the silica fiber production process are eliminated due to thermal shrinkage of the silica fibers, and the heat resistance of the silica fibers can be improved.

The average fiber diameter of the inorganic fibers is preferably 2 to 13 μm, for example. The holding mat 10 may include a binder in addition to the inorganic fibers, and may include a binder and/or a filler. For example, the holding mat 10 may include 10 to 70 mass % of vermiculite as the filler.

The shape of the holding mat 10 is not particularly limited as long as the holding mat 10 can retain the processing structure 20 inside the casing 40. The holding mat 10 may be a sheet-like body (e.g., film, sheet, blanket, or mat), or may be a tubular body.

One end and the other end of the sheet-like holding mat 10 may be formed to have a corresponding shape so that the ends can be fitted to each other. In the example illustrated in FIG. 8, one end and the other end of the holding mat 10 are formed to have a protrusion or a recess, respectively. As illustrated in FIGS. 1 and 5, one end and the other end of the holding mat 10 placed around the processing structure 20 are fitted to each other.

The bulk density of the holding mat 10 is not particularly limited, and may be appropriately set so that the bulk density is within the desired range in a state in which the holding mat 10 is incorporated in the gas processing device 1 (i.e., in a state in which the holding mat 10 is press-fit into the gap between the processing structure 20 and the casing 40). For example, the bulk density of the holding mat 10 is appropriately set corresponding to the space (gap) between the processing structure 20 and the casing 40. The basis weight of the holding mat 10 is not particularly limited, and may be appropriately set so that the basis weight is within the desired range in a state in which the holding mat 10 is incorporated in the gas processing device 1. The basis weight of the holding mat 10 may be 800 to 2500 $g/m^2$, for example.

The formed body that is formed of the inorganic fibers and forms the holding mat 10 may be produced by an arbitrary method. For example, the formed body is produced by dehydration molding (forming). In this case, an aqueous slurry that includes the inorganic fibers for forming the holding mat 10 and an organic binder (e.g., rubber, water-soluble organic polymer compound, thermoplastic resin, or thermosetting resin) is poured into a dehydration molding mold having a given shape. The aqueous slurry is subjected to dehydration molding to obtain a formed body (wet formed body) that is formed of the inorganic fibers and has a shape corresponding to the shape of the mold. The wet formed body is compressed and dried to have the desired properties (e.g., bulk density and/or basis weight) to obtain a holding mat 10 formed of the inorganic fibers.

The dehydration molding mold is not particularly limited as long as the dehydration molding mold has a structure that allows water included in the aqueous slurry to pass through, and allows the materials (e.g., inorganic fibers and organic binder) that form the holding mat 10 to remain in the mold. For example, it is preferable to use a mold that includes a wire gauze, or a tabular sheet in which a number of minute holes are formed. The formed body that is formed of the inorganic fibers and forms the holding mat 10 need not necessarily be produced by dehydration molding, but may be obtained by collecting and needling the inorganic fibers (e.g., blanket), for example.

The gas processing device 1 is assembled by disposing the processing structure 20 and the holding mat 10 inside the casing 40. For example, the holding mat 10 is placed around the processing structure 20 to obtain the assembly 30 that includes the processing structure 20 and the holding mat 10 (see FIGS. 5 and 6). The assembly 30 is then placed inside the casing 40.

When the holding mat 10 has a sheet-like shape, the holding mat 10 is wound around the processing structure 20 to obtain the assembly 30. When the holding mat 10 has a tubular shape, the processing structure 20 is inserted into the inner space of the holding mat 10 to obtain the assembly 30.

When the casing 40 has an integral body that cannot be divided, the assembly 30 is press-fit into the casing 40 through the opening formed on one end of the casing 40 in the longitudinal direction (stuffing method). When the casing 40 can be divided into pieces, the divided pieces of the casing 40 are positioned on either side of the assembly 30, and integrated (clamshell method). The divided pieces of the casing 40 are integrated by the use of tightening members (e.g., bolt and nut) and/or welding, for example.

The gas processing device 1 is used in a state in which gas is passed through the gas processing device 1 to purify the gas. Specifically, gas is introduced into the gas processing device 1 from one end of the gas processing device 1 in the longitudinal direction, purified while passing through the processing structure 20, and discharged from the other end of the gas processing device 1 in the longitudinal direction.

When the gas processing device 1 is the catalytic converter illustrated in FIGS. 1 and 2, gas (e.g., exhaust gas) is introduced into the gas processing device 1 in the direction indicated by the arrow X through one end of the casing 40, purified by the catalyst included in the processing structure 20 (catalyst carrier), and discharged from the gas processing device 1 through the other end of the casing 40.

Note that a pipe that guides gas (e.g., exhaust gas) from the upstream side to the gas processing device 1, and a pipe that guides the purified gas from the gas processing device 1 to the downstream side are respectively connected to one end and the other end of the gas processing device 1 provided in a vehicle (e.g., automobile).

The gas processing device 1 according to one embodiment of the invention is characterized in that an inner surface 41 of the casing 40 and an outer surface 11 of the holding mat 10 come in contact with each other through an adhesive layer 12 that includes a compound that includes a structural unit represented by the following general formula (I) (hereinafter referred to as "compound I") (see FIG. 4).

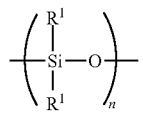

(I)

wherein $R^1$ are independently a hydrogen atom, an alkyl group having 1 to 5 carbon atoms, an alkoxy group having 1 to 5 carbon atoms, a phenyl group, or a hydroxyl group, and n is an integer equal to or larger than 1. A plurality of $R^1$ are either identical or different. Specifically, a plurality of $R^1$ bonded to one silicon atom (Si) are either identical or different. A plurality of $R^1$ respectively bonded to different silicon atoms (Si) are either identical or different. The upper limit of n in the general formula (I) is not particularly limited as long as n is within the range in which the adhesive layer 12 that includes the compound I can be formed (e.g., within the range in which the compound I or a solution that includes the compound I has fluidity that allows application). For example, n may be an integer from 1 to 2000. n may be an integer equal to or larger than 2. In this case, n may be an integer from 2 to 2000, for example.

The inventors of the invention conducted extensive studies on a technical means for appropriately controlling the frictional resistance between the holding mat 10 and the casing 40 included in the gas processing device 1. As a result, the inventors found that the holding mat 10 can be smoothly inserted into the casing 40 during canning, and the frictional resistance between the holding mat 10 and the casing 40 can be effectively increased after canning by forming the adhesive layer 12 that includes the compound I between the holding mat 10 and the casing 40.

Specifically, the compound I that is applied to the outer surface 11 of the holding mat 10 and/or the inner surface 41 of the casing 40 does not increase the frictional resistance between the holding mat 10 and the casing 40 to a large extent during canning, and effectively bonds the outer surface 11 and the inner surface 41 when heated after canning to significantly increase the frictional resistance between the holding mat 10 and the casing 40 (as described later).

In other words, the compound I that has not been heated is a precursor compound that substantially does not function as a frictional resistance enhancer that increases the frictional resistance between the holding mat 10 and the casing 40. Therefore, the operability during canning is not impaired even when the compound I is applied to the outer surface 11 of the holding mat 10 and/or the inner surface 41 of the casing 40 in advance.

Although the detailed mechanism has not yet been clarified, the inner surface 41 of the casing 40 and the outer surface 11 of the holding mat 10 are effectively bonded by heating and curing the adhesive layer 12 after canning. Specifically, the inner surface 41 and the outer surface 11 are strongly bonded through the adhesive layer 12 by heating and curing the adhesive layer 12 in a state in which the adhesive layer 12 is formed between the inner surface 41 of the casing 40 and the outer surface 11 of the holding mat 10, and the frictional resistance between the inner surface 41 and the outer surface 11 significantly increases as compared with that before heating. Therefore, the gas processing device 1 after heating has a configuration in which the inner surface 41 of the casing 40 and the outer surface 11 of the holding mat 10 come in contact with each other and are bonded through the adhesive layer 12 that has been cured by heating.

For example, when colloidal silica is applied to the holding mat 10, the holding mat 10 is cured before canning, and it is difficult to wind the holding mat 10 around the processing structure 20 before canning. In contrast, since the compound I (e.g., a compound represented by a general formula (II) (described later) and a silicone oil) maintains the flexibility of the holding mat 10 as long as the compound I is not heated, the holding mat 10 provided with the adhesive layer 12 that includes the compound I can be easily wound around the processing structure 20 before canning.

When the compound I undergoes a chemical reaction due to heating, the outer surface 11 of the holding mat 10 and the inner surface 41 of the casing 40 are bonded through the adhesive layer 12 that includes a reaction product of the compound I produced by heating.

The reaction product may be a compound produced by polymerization of the compound I due to heating, for example. In this case, the reaction product may be a compound that includes an Si—O linkage that is formed three-dimensionally, for example. The reaction product may be a compound produced by a chemical reaction between the compound I and a metal that forms the inner surface 41 of the casing 40, for example. The adhesive layer 12 after heating may include unreacted compound I.

The gas processing device 1 after heating may have a configuration in which the inner surface 41 of the casing 40 and the outer surface 11 of the holding mat 10 are bonded via an anchor effect through the adhesive layer 12. Specifically, fine elevations and depressions are formed on the inner surface 41 of the casing 40 that is formed of a metal. The outer surface 11 of the holding mat 10 is formed of the inorganic fibers, and fine elevations and depressions are formed on the surface of the inorganic fibers. Therefore, when canning is performed after forming the adhesive layer 12 that has fluidity and includes the compound I is formed in advance on the inner surface 41 of the casing 40 and/or the outer surface 11 of the holding mat 10, the compound I enters the elevations and depressions formed on the inner surface 41, the gaps between the inorganic fibers that form the outer surface 11, and the elevations and depressions formed on the surface of the inorganic fibers. In other words, the elevations and depressions formed on the inner surface 41 of the casing 40 and the gaps between the inorganic fibers that form the outer surface 11 of the holding mat 10 are filled with the compound I.

The adhesive layer 12 is then cured by heating the adhesive layer 12 formed to fill the gap between the inner surface 41 of the casing 40 and the outer surface 11 of the holding mat 10. Therefore, the inner surface 41 of the casing 40 (on which the elevations and depressions are formed) and the outer surface 11 of the holding mat 10 that is formed of the inorganic fibers are strongly bonded via the anchor effect through the cured adhesive layer 12. Note that the adhesive layer 12 that does not have fluidity may be formed between the inner surface 41 of the casing 40 and the outer surface 11 of the holding mat 10, and may be provided with fluidity by heating the adhesive layer 12 to fill the gap between the inner surface 41 and the outer surface 11 with the resulting adhesive layer 12.

It is possible to effectively prevent removal of the processing structure 20 and the holding mat 10 from the casing 40 without impairing the operability during canning by producing the gas processing device 1 so that the inner surface 41 of the casing 40 and the outer surface 11 of the holding mat 10 come in contact with each other through the adhesive layer 12 that includes the compound I.

For example, when using the stuffing method that press-fits the assembly 30 that includes the holding mat 10 into the integral casing 40, canning is performed in a state in which the inner surface 41 of the casing 40 and the outer surface 11 of the holding mat 10 come in contact with each other. In this case, it is possible to prevent a situation in which the operability during canning is impaired by forming the adhesive layer 12 that includes the compound I on the inner surface 41 and/or the outer surface 11 in advance.

Even when the holding mat 10 that has the outer surface 11 on which the adhesive layer 12 is formed in advance is wound around the processing structure 20 when producing the assembly 30, the flexibility of the holding mat 10 is not impaired due to the adhesive layer 12. Therefore, the holding mat 10 on which the adhesive layer 12 is formed can be easily wound around the processing structure 20 in the same manner as in the case where the adhesive layer 12 is not formed on the holding mat 10. For example, when colloidal silica is applied to the outer surface 11 of the holding mat 10, the flexibility of the holding mat 10 is significantly impaired due to the colloidal silica. Therefore, the holding mat 10 on which the colloidal silica has been applied cannot be wound around the processing structure 20.

Since the holding mat 10 and the casing 40 are strongly bonded by heating the adhesive layer 12 after canning, the processing structure 20 of the gas processing device 1 can be effectively retained by the holding mat 10. The holding mat 10 and the casing 40 can also be bonded in such a manner when using the clamshell method that utilizes the casing 40 that can be divided into pieces.

The gas processing device 1 after heating may have a configuration in which the inner surface 41 of the casing 40 and the outer surface 11 of the holding mat 10 are bonded to each other so that pieces of the inorganic fibers that form the holding mat 10 remain on the inner surface 41 of the casing 40 in a bonded state when the casing 40 and the holding mat 10 are separated from each other, for example.

Specifically, at least some of the inorganic fibers that form the outer surface 11 of the holding mat 10 are strongly bonded to the inner surface 41 of the casing 40 through the adhesive layer 12. Therefore, when the casing 40 and the holding mat 10 are separated from each other, some of the inorganic fibers that form the holding mat 10 and have been bonded to the inner surface 41 of the casing 40 break, and remain on the inner surface 41 in a bonded state. The gas processing device 1 according to one embodiment of the invention is also characterized in that the inorganic fibers that form the holding mat 10 are strongly bonded to the inner surface 41 of the casing 40 as described above.

When the casing 40 has an integral structure, the casing 40 and the holding mat 10 may be separated from each other by removing the holding mat 10 (i.e., pushing the assembly 30 that includes the holding mat 10 and the processing structure 20) from the casing 40 in the longitudinal direction, for example. When the casing 40 can be divided into pieces, the casing 40 and the holding mat 10 may be separated from each other by dividing the casing 40 into pieces, and removing one of the pieces of the casing 40.

A method for producing the gas processing device 1 is described in detail below. The method for producing the gas processing device 1 includes a placement step that places the holding mat 10 between the processing structure 20 and the casing 40 so that the inner surface 41 of the casing 40 and the outer surface 11 of the holding mat 10 come in contact with each other through the adhesive layer 12 that includes the compound I.

In the placement step, the adhesive layer 12 that includes the compound I is formed on the inner surface 41 of the casing 40 and/or the outer surface 11 of the holding mat 10 in advance, and the holding mat 10 is placed between the processing structure 20 and the casing 40 (canning).

For example, the holding mat 10 that has the outer surface 11 on which the adhesive layer 12 is formed in advance is placed between the processing structure 20 and the casing 40. Alternatively, the holding mat 10 is placed between the processing structure 20 and the casing 40 that has the inner surface 41 on which the adhesive layer 12 is formed in advance.

Since the adhesive layer 12 that is formed on the inner surface 41 of the casing 40 and/or the outer surface 11 of the holding mat 10 before canning does not increase the frictional resistance between the inner surface 41 and the outer surface 11 to a large extent, the operability during canning is not impaired.

For example, when using the stuffing method, since the assembly 30 that includes the holding mat 10 and the processing structure 20 is press-fit through one end of the integral casing 40 in the longitudinal direction, canning is performed in a state in which the inner surface 41 of the casing 40 and the outer surface 11 of the holding mat 10 are rubbed against each other.

However, the adhesive layer 12 that includes the compound I before heating does not increase the frictional resistance between the inner surface 41 of the casing 40 and the outer surface 11 of the holding mat 10 to a large extent. Therefore, use of the adhesive layer 12 that includes the compound I does not impair the operability during canning when using the stuffing method. Use of the adhesive layer 12 also does not impair the operability during canning when using the clamshell method.

The adhesive layer 12 is formed on the outer surface 11 of the holding mat 10 and/or the inner surface 41 of the casing 40 before canning by applying the compound I to at least part of the outer surface 11 and/or the inner surface 41.

The adhesive layer 12 may be formed on at least part of the outer surface 11 of the holding mat 10 using an arbitrary method. For example, it is preferable to impregnate at least part of the outer surface 11 with a solution that includes the compound I and/or the compound I in a liquid state. In this case, the adhesive layer 12 (shown hatched in FIGS. 7 and 9) is formed on the outer surface 11 of the holding mat 10 and an area around the outer surface 11. Specifically, the compound I is held on the surface of the inorganic fibers that form the outer surface 11 of the holding mat 10 and an area around the outer surface 11 and, between the inorganic fibers, to form the adhesive layer 12.

The adhesive layer 12 may be formed on at least part of the inner surface 41 of the casing 40 using an arbitrary method. For example, it is preferable to apply a solution that includes the compound I and/or the compound I in a liquid state to at least part of the inner surface 41.

The adhesive layer 12 may be formed on the outer surface 11 of the holding mat 10 and/or the inner surface 41 of the casing 40 using a spray method (e.g., curtain spraying method) and/or a transfer method (e.g., a method that applies a solution that includes the compound I and/or the compound I in a liquid state to the surface of a transfer roller, and brings the surface of the transfer roller into contact with the outer surface 11 of the holding mat 10 and/or the inner surface 41 of the casing 40 to transfer the solution that includes the compound I and/or the compound I in a liquid state onto the outer surface 11 and/or the inner surface 41). Note that the method is not limited thereto as long as a method that applies a liquid is used.

It is preferable that the solution that includes the compound I and/or the compound I in a liquid state have fluidity so as to enter the gaps between the inorganic fibers that form the outer surface 11 of the holding mat 10 and the elevations and depressions formed on the inner surface 41 of the casing 40. The amount of the compound I applied to the outer surface 11 of the holding mat 10 and/or the inner surface 41 of the casing 40 is appropriately determined to achieve the desired adhesion between the outer surface 11 and the inner surface 41.

The range in which the adhesive layer 12 is formed on the outer surface 11 of the holding mat 10 and/or the inner surface 41 of the casing 40 is not particularly limited as long as the gas processing device 1 exhibits the desired retention capability. The range in which the adhesive layer 12 is formed on the outer surface 11 of the holding mat 10 and/or the inner surface 41 of the casing 40 may be part or the entirety of the outer surface 11 and/or the inner surface 41 (i.e., part or the entirety of the outer surface 11 and/or part or the entirety of the inner surface 41).

Specifically, when forming the adhesive layer 12 on part of the outer surface 11 of the holding mat 10 and/or the inner surface 41 of the casing 40, the adhesive layer 12 may be formed on part of the circumferential surface of the entirety or part (e.g., each end or one end in the longitudinal direction) of the outer surface 11 and/or the inner surface 41 in the longitudinal direction (i.e., the direction indicated by the arrow X illustrated in FIGS. 1 and 2), or may be formed on the entire circumferential surface (i.e., ring-shaped range) of part of the outer surface 11 and/or the inner surface 41 in the longitudinal direction.

For example, the adhesive layer 12 may be formed on part or the entirety (preferably the entirety) of the circumferential surface of the end of the outer surface 11 of the holding mat 1 on the upstream side (i.e., the side where the processing target gas is introduced into the gas processing device 1) in the longitudinal direction of the gas processing device 1. For example, the adhesive layer 12 may be formed on part or the entirety (preferably the entirety) of the circumferential surface of the end of the outer surface 11 of the holding mat 1 on the upstream side in the longitudinal direction of the gas processing device 1, and part or the entirety (preferably the entirety) of the circumferential surface of the end of the outer surface 11 of the holding mat 1 on the downstream side in the longitudinal direction of the gas processing device 1. When the adhesive layer 12 is formed on the upstream-side end, or the upstream-side end and the downstream-side end of the outer surface 11 of the holding mat 10, the adhesive layer 12 may not be formed in the area of the outer surface 11 other than the upstream-side end, or the area of the outer surface 11 other than the upstream-side end and the downstream-side end (i.e., the center area of the outer surface 11). Note that the adhesive layer 12 may also be formed on the upstream-side end, or the upstream-side end and the downstream-side end of the inner surface 41 of the casing 40.

The shape of the adhesive layer 12 formed on the outer surface 11 of the holding mat 10 and/or the inner surface 41 of the casing 40 is not particularly limited as long as the gas processing device 1 exhibits the desired retention capability. The adhesive layer 12 may be formed linearly, or may be formed in a stripe pattern, or may be formed in a checkered pattern, or may be formed in an island-like pattern.

For example, the adhesive layer 12 may be formed in an area equal to or more than 1% of the area of the outer surface 11 of the holding mat 10 and/or the inner surface 41 of the casing 40. The adhesive layer 12 may be formed in an area equal to or more than 2% of the area of the outer surface 11 of the holding mat 10 and/or the inner surface 41 of the casing 40, or may be formed in an area equal to or more than 3% of the area of the outer surface 11 of the holding mat 10 and/or the inner surface 41 of the casing 40. When forming the adhesive layer 12 on most of the outer surface 11 of the holding mat 10 and/or the inner surface 41 of the casing 40, the adhesive layer 12 may be formed in an area equal to or more than 70% of the area of the outer surface 11 and/or the inner surface 41, for example. The adhesive layer 12 may be formed on the entirety of the outer surface 11 of the holding mat 10 and/or the inner surface 41 of the casing 40.

The adhesive layer 12 may be formed on the outer surface 11 of the holding mat 10 before producing the assembly 30, or may be formed on the outer surface 11 of the holding mat 10 after producing the assembly 30. Specifically, the adhesive layer 12 may be formed on the outer surface 11 of the holding mat 10, and the holding mat 10 may be placed around the processing structure 20 to produce the assembly 30, or the adhesive layer 12 may be formed on the outer surface 11 of the holding mat 10 that is placed around the processing structure 20 after producing the assembly 30.

When impregnating the outer surface 11 of the holding mat 10 with a solution that includes the compound I and/or the compound I in a liquid state, the thickness of the adhesive layer 12 to be formed may be adjusted by adjusting the concentration of the compound I included in the solution, the viscosity of the solution and the compound I in a liquid state, and/or the amount of the solution and the compound I in a liquid state, for example.

As illustrated in FIG. 10, the holding mat 10 may include a base member 10a, and a surface member 10b that is stacked on the base member 10a, and impregnated with a solution that includes the compound I and/or the compound I in a liquid state. When producing the holding mat 10 having such a configuration, the base member 10a and the surface member 10b are formed separately. At least one surface of the surface member 10b (i.e., at least the surface that serves as the outer surface 11 of the holding mat 10) is impregnated with a solution that includes the compound I and/or the compound I in a liquid state. The surface member 10b that has been impregnated with the solution that includes the compound I and/or the compound I in a liquid state is then stacked on the base member 10a.

It is possible to reliably control the thickness of the adhesive layer 12 in the holding mat 10 within the range of the thickness of the surface member 10b by stacking the surface member 10b that has been impregnated with the solution that includes the compound I and/or the compound I in a liquid state on the base member 10a. It is also possible to control the thickness of the adhesive layer 12 by adjusting the thickness of the surface member 10b. Note that the adhesive layer 12 may be formed by another method when the holding mat 10 includes the base member 10a and the surface member 10b. For example, the surface member 10b stacked on the base member 10a may be impregnated with a solution that includes the compound I and/or the compound I in a liquid state. It is preferable that each of the base member 10a and the surface member 10b be a sheet-like body (e.g., film, sheet, blanket, or mat) formed of inorganic fibers. Note that the base member 10a and the surface member 10b may have a different shape (e.g., cylindrical shape).

The gas processing device 1 obtained by the placement step has a configuration in which the inner surface 41 of the casing 40 and the outer surface 11 of the holding mat 10 come in contact with each other through the adhesive layer 12. Specifically, when the adhesive layer 12 has been formed by applying a solution that includes the compound I and/or the compound I in a liquid state, the inner surface 41 of the casing 40 and the outer surface 11 of the holding mat 10 come in contact with each other through the compound I. In this case, it is preferable that the solution that includes the compound I and/or the compound I in a liquid state have fluidity so as to enter the elevations and depressions formed on the inner surface 41 of the casing 40 and the gaps between the inorganic fibers that form the outer surface 11 of the holding mat 10.

The inner surface 41 of the casing 40 and the outer surface 11 of the holding mat 10 are effectively bonded by heating the adhesive layer 12 after canning. Therefore, the method for producing the gas processing device 1 may further include a bonding step that heats and cures the adhesive layer 12 in a state in which the inner surface 41 of the casing 40 and the outer surface 11 of the holding mat 10 come in contact with each other through the adhesive layer 12 to bond the inner surface 41 and the outer surface 11.

In the bonding step, the adhesive layer 12 formed at the boundary between the inner surface 41 of the casing 40 and the outer surface 11 of the holding mat 10 is heated and cured. As a result, the inner surface 41 of the casing 40 and the outer surface 11 of the holding mat 10 are strongly bonded through the cured adhesive layer 12. Note that the adhesive layer 12 may be cured by cooling the adhesive layer 12 after heating, for example.

The heating conditions (e.g., temperature, time, and method) employed when heating the adhesive layer 12 are not particularly limited as long as the outer surface 11 of the holding mat 10 and the inner surface 41 of the casing 40 can be effectively bonded.

The heating temperature may be 150° C. or more, or may be 200° C. or more, or may be more than 200° C., or may be 250° C. or more, or may be 300° C. or more, for example. The heating temperature may be 350° C. or more, or may be 400° C. or more, or may be 450° C. or more, or may be 500° C. or more.

The upper limit of the heating temperature is not particularly limited as long as the performance of the gas processing device 1 is not significantly impaired. The heating temperature may be less than the melting point of the inorganic fibers that form the holding mat 10, for example. The heating temperature may be 1000° C. or less (e.g., when the holding mat 10 includes inorganic fibers having a melting point of more than 1000° C. (e.g., alumina fibers) as the main component), and is preferably 900° C. or less, for example. The heating temperature range may be determined by arbitrarily combining the upper limit and the lower limit of the heating temperature mentioned above.

The adhesive layer 12 may be heated using an arbitrary method. For example, the gas processing device 1 may be held for a given time in an atmosphere (e.g., inside an electric furnace) at a given heating temperature, or a high-temperature gas may be passed through the processing structure 20 of the gas processing device 1 so that the adhesive layer 12 is heated at a given heating temperature, or an area around the adhesive layer 12 of the casing 40 of the gas processing device 1 may be locally heated using a heating system such as a heater.

If the temperature of gas (e.g., purification target exhaust gas) to be processed by the gas processing device 1 is within a range suitably employed for heating the adhesive layer 12, the adhesive layer 12 may be heated by processing the gas using the gas processing device 1 (i.e., by utilizing the gas processing device 1 to purify the gas), for example.

In the bonding step, the inner surface 41 of the casing 40 and the outer surface 11 of the holding mat 10 may be bonded via an anchor effect through the adhesive layer 120. In this case, the adhesive layer 120 is formed in the placement step so that the compound I enters the elevations and depressions formed on the inner surface 41 of the casing 40, and the gaps between the inorganic fibers that form the outer surface 11 of the holding mat 10. In the bonding step, the adhesive layer 12 positioned between the inner surface 41 of the casing 40 and the outer surface 11 of the holding mat 10 is heated, and cured in a state in which the compound I and/or a chemical reaction product of the compound I is positioned on the elevations and depressions formed on the inner surface 41 of the casing 40, and the gaps between the inorganic fibers that form the outer surface 11 of the holding mat 10.

In the bonding step, the inner surface 41 of the casing 40 and the outer surface 11 of the holding mat 10 may be bonded to each other through the adhesive layer 12 so that pieces of the inorganic fibers that form the holding mat 10 remain on the inner surface 41 of the casing 40 in a bonded state when the casing 40 and the holding mat 10 are separated from each other.

The compound I included in the adhesive layer 12 is not particularly limited as long as the compound I includes the structural unit represented by the general formula (I). For example, the compound I included in the adhesive layer 12 may be a compound represented by following general formula (II) (hereinafter referred to as "compound II").

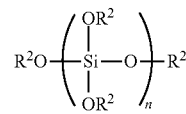

(II)

wherein $R^2$ are independently a hydrogen atom or an alkyl group having 1 to 5 carbon atoms, and n is an integer equal to or larger than 1. The compound II is a compound represented by $Si_nO_{n-1}(OR^2)_{2n+2}$ (wherein $R^2$ are a hydrogen atom or an alkyl group having 1 to 5 carbon atoms, and n is an integer equal to or larger than 1), for example. $R^2$ in the general formula (II) may independently be a hydrogen atom or an alkyl group having 1 to 3 carbon atoms. n in the general formula (II) may be an integer equal to or larger than 2. When n is an integer equal to or larger than 2, the compound II is a polycondensate, and is rarely volatilized as compared with the monomer, for example.

The upper limit of n in the general formula (II) is not particularly limited as long as n is within the range in which the adhesive layer that includes the compound II can be formed (e.g., within the range in which the compound II or a solution that includes the compound II has fluidity that allows application). For example, n may be an integer from 1 to 1000, or may be an integer from 1 to 100. When the compound II is a polycondensate, n in the general formula (II) may be an integer from 2 to 1000, or may be an integer from 2 to 100, for example.

A plurality of $R^2$ in the general formula (II) are either identical or different. Specifically, a plurality of $R^2$ bonded to one silicon atom (Si) through the corresponding oxygen atom (O) are either identical or different. A plurality of $R^2$ bonded to different silicon atoms (Si) through the corresponding oxygen atom (O) are either identical or different.

When at least one $R^2$ in the general formula (II) is a hydrogen atom, the compound II is a silanol or a polymer thereof (polysilanol). Specifically, when one or more of $R^2$ in the general formula (II) are a hydrogen atom, and the remainder of $R^2$ is/are an alkyl group, the compound II is an alkoxysilanol or a polymer thereof. The compound II may be one or more compounds selected from the group consisting of a monoalkoxysilanol, a polycondensate thereof, a dialkoxysilanol, a polycondensate thereof, a trialkoxysilanol, and a polycondensate thereof, for example. When the alkoxysilanol includes a plurality of alkoxy groups, all of the plurality of alkoxy groups may be identical, or some of the plurality of alkoxy groups may be different from the remainder of the plurality of alkoxy groups. The alkoxysilanol or a polycondensate thereof may be produced by hydrolysis of an alkoxysilane or a polycondensate thereof (described later).

When all of $R^2$ in the general formula (II) are an alkyl group, the compound II is an alkoxysilane (alkyl silicate) or a polycondensate thereof (alkyl polysilicate). In this case, the compound II is a tetraalkoxysilane or a polycondensate thereof. Specifically, the compound II may be one or more compounds selected from the group consisting of tetramethoxysilane (methyl silicate), a polycondensate thereof (methyl polysilicate), tetraethoxysilane (ethyl silicate), and a polycondensate thereof (ethyl polysilicate), for example.

The adhesive layer 12 that includes the compound II is preferably formed by applying a solution that includes the compound II. The solution that includes the compound II preferably includes an alcohol as the solvent. It is preferable to use an alcohol having 1 to 3 carbon atoms (e.g., methanol, ethanol, or isopropanol) as the solvent. The solution that includes the compound II may include water as the solvent.

When using a solution that includes the compound II and water wherein the compound II is an alkoxysilane or a polycondensate thereof, it is possible to form the adhesive layer 12 that includes an alkoxysilanol or a polycondensate thereof produced by hydrolysis of the alkoxysilane or a polycondensate thereof in addition to, or instead of, the alkoxysilane or a polycondensate thereof. Note that hydrolysis of the alkoxysilane or a polycondensate thereof can be effected in a gas phase (e.g., in air) in the presence of water. A polycondensation reaction of the alkoxysilane or a polycondensate thereof normally occurs at the same time as hydrolysis of the alkoxysilane or a polycondensate thereof.

The concentration of the compound II in the solution is appropriately determined within a range that is suitable for application of the solution. For example, the concentration of the compound II is preferably 0.1 to 50 mass % ($SiO_2$ basis), and more preferably 0.5 to 20 mass % ($SiO_2$ basis). The adhesive layer 12 formed by applying a solution that includes the compound II to the inner surface 41 of the casing 40 and/or the holding mat 10 may be a gel-like layer.

The compound I may be a compound represented by the following general formula (III) (hereinafter referred to as "compound III").

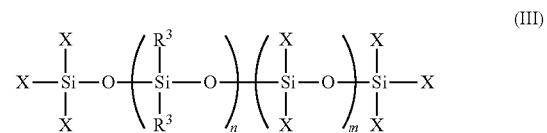

wherein $R^3$ are independently a hydrogen atom, an alkyl group having 1 to 5 carbon atoms, an alkoxy group having 1 to 5 carbon atoms, a phenyl group, or a hydroxyl group, X are independently a hydrogen atom, an alkyl group having 1 to 5 carbon atoms, an aryl group having 6 to 12 carbon atoms, an alkoxy group having 1 to 5 carbon atoms, a phenyl group, a hydroxyl group, or an organic group other than the above groups, n is an integer equal to or larger than 1, and m is an integer equal to or larger than 1. A plurality of $R^3$ are either identical or different. Specifically, a plurality of $R^3$ bonded to one silicon atom (Si) are either identical or different. A plurality of $R^3$ respectively bonded to different silicon atoms (Si) are either identical or different.

$R^3$ in the general formula (III) may independently be a hydrogen atom or an alkyl group having 1 to 5 carbon atoms. A plurality of $R^3$ are either identical or different. X may independently be a hydrogen atom, an alkyl group having 1 to 5 carbon atoms, an aryl group having 6 to 12 carbon atoms, a hydroxyl group, or an organic group other than the above groups. A plurality of X are either identical or different.

The organic group represented by X in the general formula (III) is not particularly limited as long as the effects of the compound III are not impaired. Examples of the organic group represented by X in the general formula (III) include an amino group, an epoxy group, a polyether group, an aralkyl group, a mercapto group, a carboxyl group, a methacryl group, and a phenol group. A plurality of $R^3$ are either identical or different. A plurality of organic groups are either identical or different.

The upper limit of n and the upper limit of m in the general formula (III) are not particularly limited as long as n and m are within the ranges in which the adhesive layer 12 that includes the compound III can be formed (e.g., within the ranges in which the compound III or a solution that includes the compound III has fluidity that allows application). For example, n and m may be arbitrary integers provided that the sum of n and m is 2 to 2000. When the sum of n and m is 2000 or less, the compound III is a liquid having fluidity (i.e., has relatively low viscosity) that is suitable for strongly bonding the inner surface 41 of the casing 40 and the outer surface 11 of the holding mat 10 via an anchor effect. The combination of $R^3$, X, n, and m in the general formula (III) is arbitrary.

The compound I may be a compound represented by the following general formula (IV) (hereinafter referred to as "compound IV").

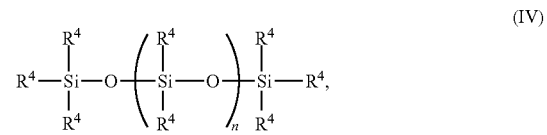

wherein $R^4$ are independently a hydrogen atom, an alkyl group having 1 to 5 carbon atoms, an alkoxy group having 1 to 5 carbon atoms, a phenyl group, or a hydroxyl group, and n is an integer equal to or larger than 1. $R^4$ in the general formula (IV) may independently be a hydrogen atom or an alkyl group having 1 to 5 carbon atoms. A plurality of $R^4$ are either identical or different. Specifically, a plurality of $R^4$ bonded to one silicon atom (Si) are either identical or different. A plurality of $R^4$ respectively bonded to different silicon atoms (Si) are either identical or different. When all of $R^4$ are an alkyl group, the compound IV is a dialkylpolysiloxane.

The upper limit of n in the general formula (IV) is not particularly limited as long as n is within the range in which the adhesive layer 12 that includes the compound IV can be formed (e.g., within the range in which the compound IV or a solution that includes the compound IV has fluidity that allows application). For example, n may be an integer from 1 to 2000. When n is 2000 or less, the compound IV is a liquid having fluidity (i.e., has relatively low viscosity) that is suitable for strongly bonding the inner surface 41 of the casing 40 and the outer surface 11 of the holding mat 10 via an anchor effect.

The compound I may be a silicone oil. In this case, the compound I is a silicone oil that includes the structural unit represented by the general formula (I). The upper limit of n in the general formula (I) is not particularly limited as long as n is within the range in which the adhesive layer 12 that includes the silicone oil can be formed (e.g., within the range in which the silicone oil or a solution that includes the silicone oil has fluidity that allows application). For example, n may be an integer from 1 to 2000, or may be an integer from 2 to 2000. The silicone oil may be the compound III or the compound IV, for example. The silicone oil has fluidity (i.e., has relatively low viscosity) that is suitable for strongly bonding the inner surface 41 of the casing 40 and the outer surface 11 of the holding mat 10 via an anchor effect. The silicone oil may be diluted with an appropriate solvent (e.g., an organic solvent such as toluene).

When the adhesive layer 12 includes the compound II, the adhesive layer 12 may include the compound II represented by the general formula (II) wherein at least one $R^2$ is a hydrogen atom to form a hydroxyl group, and a capping compound that protects the hydroxyl group.

The capping compound is not particularly limited as long as the capping compound can protect the hydroxyl group included in the compound II. For example, the capping compound may be a silane capping compound that includes Si. The silane capping compound is not particularly limited as long as the silane capping compound can protect the hydroxyl group included in the compound II. For example, the silane capping compound may be a compound represented by the following general formula (V) (hereinafter referred to as "compound V").

$$Y_n S_i Z_{4-n} \quad (V)$$

wherein Y is (or are independently) a hydrogen atom, a chlorine atom, a bromine atom, an iodine atom, a hydroxyl group, or an alkoxy group having 1 to 10 carbon atoms, Z is (or are independently) an alkyl group having 1 to 10 carbon atoms, an allyl group having 1 to 10 carbon atoms, or an aryl group having 6 to 12 carbon atoms, and n is an integer from 1 to 3.

When Y in the general formula (V) is an alkoxy group, and Z in the general formula (V) is an alkyl group, the compound V is an alkylalkoxysilane. In this case, the compound V is a trialkylalkoxysilane (n=1), a dialkyldialkoxysilane (n=2), or an alkyltrialkoxysilane (n=3), for example.

The capping compound may be one or more compounds selected from the group consisting of trimethylmethoxysilane, dimethyldimethoxysilane, methyltrimethoxysilane, methyltriethoxysilane, dimethyldiethoxysilane, n-propyltrimethoxysilane, and n-propyltriethoxysilane, for example.

The capping compound chemically reacts with the hydroxyl group included in the compound II to introduce a protecting group into the hydroxyl group. For example, when the capping compound is a trialkylalkoxysilane, a trialkylsilyl group is introduced into the hydroxyl group included in the compound II as the protecting group.

Therefore, when using the capping compound and the compound II in combination, the adhesive layer 12 includes a reaction product of the compound II and the capping compound (i.e., a compound that includes a functional group (e.g., —OSiR$_3$ (R is an alkyl group)) produced by introduction of the protecting group into the hydroxyl group).

The adhesive layer 12 may include only one type of the compound I, or may include two or more types of the compound I. For example, when the adhesive layer 12 includes two or more types of the compound I, the adhesive layer 12 may include a first adhesive layer that is formed on the outer surface 11 of the holding mat 10 and includes a first type of the compound I, and a second adhesive layer that is stacked on the first adhesive layer and includes a second type of the compound I that differs from the first type of the compound I. For example, the adhesive layer 12 may include a first adhesive layer that is formed on the outer surface 11 of the holding mat 10 and includes the compound II (e.g., an alkoxysilane (alkyl silicate) or a polycondensate thereof (alkyl polysilicate)), and a second adhesive layer that is stacked on the first adhesive layer and includes a silicone oil. For example, the first adhesive layer may be formed by impregnating the outer surface 11 of the holding mat 10 with the first type of the compound I, and the second adhesive layer may be formed by applying the second type of the compound I to the first adhesive layer. The adhesive layer 12 that includes a first adhesive layer and a second adhesive layer may be formed on the inner surface 41 of the casing 40 in the same manner as described above. When the adhesive layer 12 includes two or more types of the compound I, the adhesive layer 12 may include a mixture of a first type of the compound I and a second type of the compound I that differs from the first type of the compound I.

Specific examples according to the embodiments of the invention are described below.

EXAMPLE 1

Production of Holding Mat

A holding mat 10 (i.e., inorganic fiber body) was produced by dehydration molding. Specifically, an aqueous slurry was prepared by mixing 100 parts by mass of alumina fibers (alumina: 80 mass %, silica: 20 mass %), 5 parts by mass of an organic binder (acrylic resin), 1 part by mass of an inorganic binder (e.g., alumina sol or silica sol), and 20,000 parts by mass of water.

The aqueous slurry was poured into a dehydration molding mold having a wire gauze, and subjected to dehydration molding to obtain a wet formed body. The wet formed body was dried at 100° C. while compressing the entire wet formed body to have a uniform thickness. A mat-like (200 mm×250 mm) inorganic fiber body having a basis weight of 1000 g/m$^2$ and a bulk density of 0.15 g/cm$^3$ was thus obtained.

In Example 1, the inorganic fiber body was cut, and the two largest surfaces (50 mm×50 mm) of the cut inorganic fiber body (within the range of 5 mm from each end) were impregnated with a solution (solvent: water and ethanol) of commercially available tetraethoxysilane (ethyl silicate) in the form of ethyl polysilicate (n=4 to 6 (pentamer on average)) (concentration: 2 mass % (silica ($SiO_2$) basis)) to obtain a holding mat 10 on which an adhesive layer 12 including ethyl polysilicate was formed.

In Comparative Example 1-1, the inorganic fiber body to which no compound was applied was used as a comparative holding mat. In Comparative Example 1-2, the two largest surfaces (50 mm×50 mm) of the inorganic fiber body (within the range of 5 mm from each end) were impregnated with a a 2 mass % aqueous solution of colloidal silica to obtain a comparative holding mat.

Evaluation of Frictional Resistance

Figure 11:
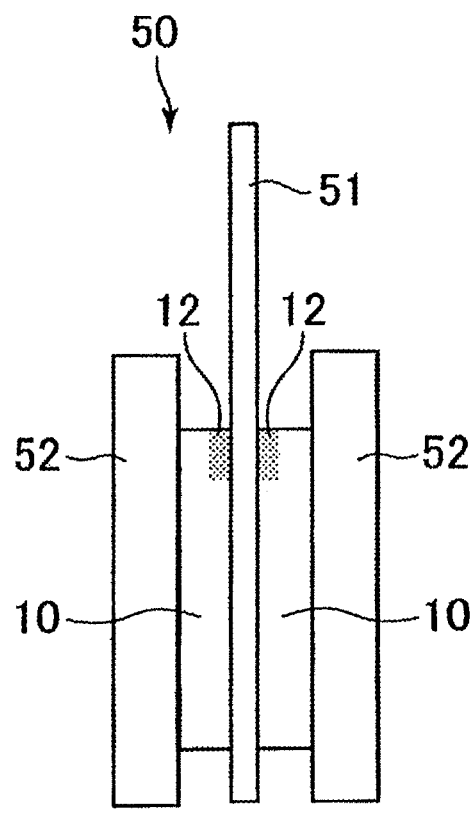
FIG. 11 is a view illustrating an outline of a tester used in Example 1.

The coefficient of static friction was measured using a tester 50 illustrated in FIG. 11 to evaluate the frictional resistance between the holding mat 10 and the surface of a metal. The tester 50 includes a tensile jig 51 (tabular sheet made of stainless steel (SUS)) (i.e., a member that corresponds to the casing 40), and a pair of compression jigs 52 (tabular sheets made of stainless steel (SUS)) that compress the tensile jig 51 and the holding mat 10.

As illustrated in FIG. 11, two holding mats 10 (on which the adhesive layer 12 was formed by impregnation with the ethyl polysilicate solution) were placed on either side of the tensile jig 51, and the holding mats 10 and the tensile jig 51 were held by the compression jigs 52 positioned on either side. The distance between the tensile jig 51 and each compression jig 52 was adjusted to a given value.

The holding mats 10 held by the tester 50 were heated at 200° C., 500° C., or 700° C. for 1 hour in an electric furnace (temperature increase rate: 200° C./h), and allowed to cool. The repulsion force applied to the compression jigs 52 from the holding mats 10 held by the tester 50 was measured as surface pressure N (N).

The tensile jig 51 was pulled in the upward direction in FIG. 11 to measure the maximum shear force F (N) when the tensile jig 51 was removed from the holding mats 10. The coefficient of static friction $\mu$ (–) was calculated by "$\mu=(F/N)/2$" as an index of the frictional resistance between the holding mat 10 and the tensile jig 51.

The coefficient of static friction $\mu$ was also calculated in the same manner as described above using the comparative holding mat obtained in Comparative Example 1-1 or the comparative holding mat obtained in Comparative Example 1-2 instead of the holding mat 10.

Figure 12:
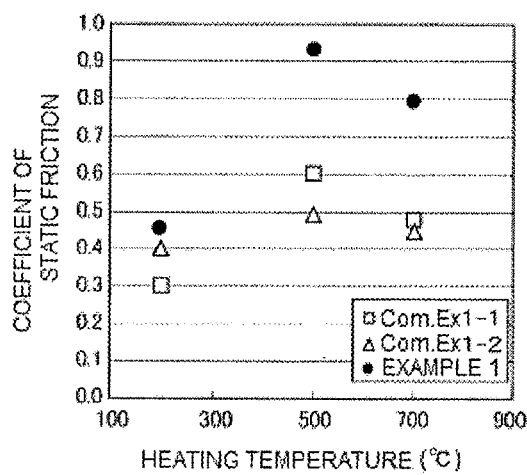
FIG. 12 is a view illustrating an example of the coefficient of static friction evaluation results obtained in Example 1.

FIG. 12 shows the evaluation results. In FIG. 12, the horizontal axis indicates the heating temperature (° C.), and the vertical axis indicates the coefficient of static friction (–). In FIG. 12, the white squares indicate the results obtained in Comparative Example 1-1, the white triangles indicate the results obtained in Comparative Example 1-2, and the black circles indicate the results obtained in Example 1.

As shown in FIG. 12, the coefficient of static friction measured in Comparative Example 1-2 (in which colloidal silica was applied) did not significantly differ from the coefficient of static friction measured in Comparative Example 1-1 (in which no compound was applied) independently of the heating temperature.

In contrast, the coefficient of static friction measured in Example 1 (in which ethyl polysilicate was applied) was larger than those of Comparative Example 1-1 and Comparative Example 1-2. In particular, the coefficient of static friction measured in Example 1 was significantly larger than those of Comparative Example 1-1 and Comparative Example 1-2 when the heating temperature was higher than 200° C. (i.e., when the heating temperature was 500° C. or 700° C.).

It was confirmed by naked eye observation that pieces of the alumina fibers forming the holding mat 10 of Example 1 remained on the surface of the tensile jig 51 in a bonded state (at each heating temperature) after the tensile jig 51 was separated from the holding mat 10.

Specifically, the outer surface 11 of the holding mat 10 to which ethyl polysilicate was applied and which was heated was strongly bonded to the surface of the tabular stainless steel sheet used as the tensile jig 51. Such a phenomenon was not observed in Comparative Example 1-1 and Comparative Example 1-2.

EXAMPLE 2

Production of Holding Mat

A mat-like (370 mm×90 mm, thickness: 9 mm) inorganic fiber body having a basis weight of about 800 to 1500 g/m² and a bulk density of 0.15 to 0.20 g/cm³ was obtained in the same manner as in Example 1.

In Example 2, one surface (370 mm×90 mm) of the inorganic fiber body (within the range of 5 mm from the end) was impregnated with a solution (solvent: water and ethanol) of the above ethyl polysilicate (concentration: 4 mass % (silica ($SiO_2$) basis)) to obtain a holding mat 10 on which an adhesive layer 12 including ethyl polysilicate was formed. In Comparative Example 2, the inorganic fiber body to which no compound was applied was used as a comparative holding mat.

Production of Gas Processing Device

A gas processing device 1 (catalytic converter) was produced by assembling a processing structure 20 (cylindrical ceramic catalyst carrier, outer diameter: 110 mm), the holding mat 10, and a cylindrical stainless steel casing 40 (inner diameter: 118 mm).

Specifically, the holding mat 10 was wound around the outer circumferential surface of the processing structure 20 so that the outer surface 11 to which ethyl polysilicate was applied was disposed on the outer side in the diametrical direction of the processing structure 20 to obtain an assembly 30 illustrated in FIGS. 5 to 7.

The assembly 30 was press-fit into the casing 40 using the stuffing method so that the outer surface 11 of the holding mat 10 came in contact with the inner surface 41 of the casing 40 to obtain the gas processing device 1. The gas processing device 1 was heated at 700° C. for 1 hour in an electric furnace.

A comparative gas processing device was produced in the same manner as described above, except that the comparative holding mat obtained in Comparative Example 2 was used instead of the holding mat 10.

Evaluation of Insertion Force During Canning and Pushing Force after Canning

Figures 13, 14:
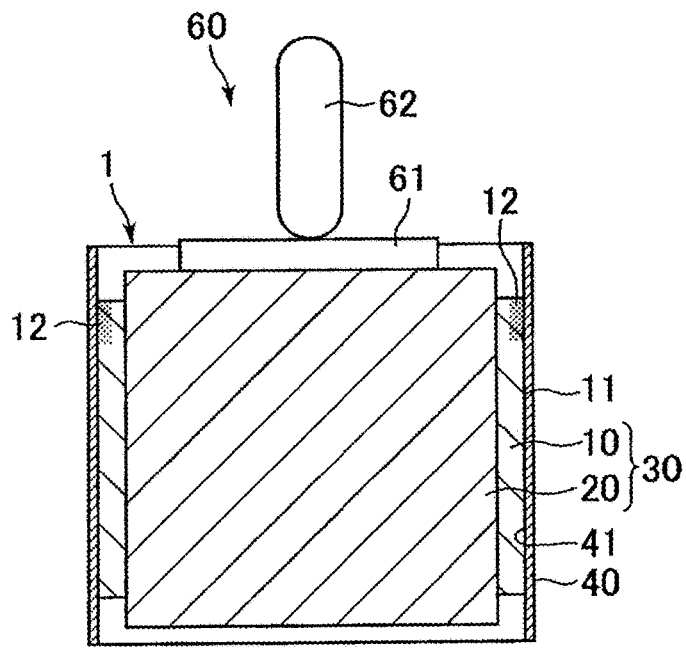
FIG. 13 is a view illustrating an outline of a tester used in Example 2.
FIG. 14 is a view illustrating an example of the results obtained in Example 2.

The insertion force during canning and the pushing force after canning were evaluated using a tester 60 illustrated in FIG. 13. The tester 60 includes a push jig 61 (stainless steel disc) placed on one end of the processing structure 20 in the longitudinal direction, and a push rod 62 that pushes the processing structure 20 in the downward direction in FIG. 13 through the push jig 61.

The assembly 30 was inserted into the casing 40 using the tester 60 to measure the maximum load required for insertion as insertion force (N).

Before heating the gas processing device 1, the maximum load required to push the assembly 30 out from the casing 40 (i.e., the maximum load required to remove the holding mat 10 from the casing 40) was measured as the ordinary-state pushing force (N).

After heating the gas processing device 1, the maximum load required to push the assembly 30 out from the casing 40 (i.e., the maximum load required to remove the holding mat 10 from the casing 40) was measured as the post-heating pushing force (N). The above measurements were also performed using the comparative gas processing device obtained in Comparative Example 2.

Figure 15:
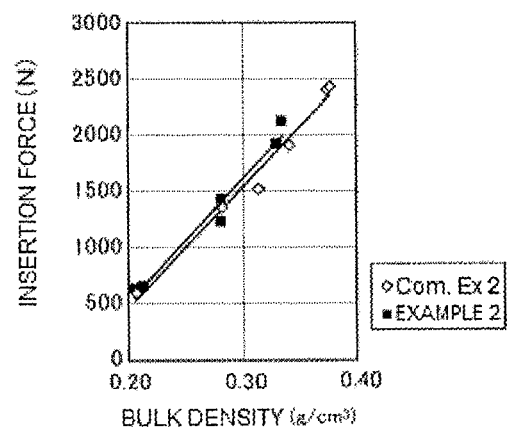
FIG. 15 is a view illustrating an example of the insertion force measurement results obtained in Example 2.
Figure 16:
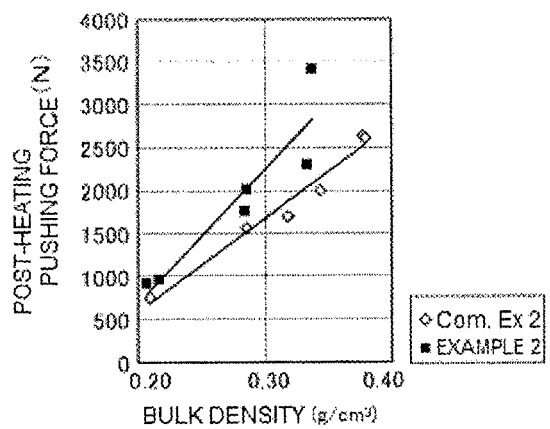
FIG. 16 is a view illustrating an example of the post-heating pushing force measurement results obtained in Example 2.

FIGS. 14 to 16 show the measurement results. FIG. 14 shows the measurement results for the insertion force (N), the ordinary-state pushing force (N), and the post-heating pushing force (N) measured using six comparative gas processing devices (Comparative Example 2) that differed in the basis weight ($g/cm^2$) and the bulk density ($g/cm^3$) of the comparative holding mat, and six comparative gas processing devices (Example 2) that differed in the basis weight ($g/cm^2$), the ethyl polysilicate application amount ($SiO_2$ basis) (g), and the bulk density ($g/cm^3$) of the holding mat 10. Note that the bulk density shown in FIG. 14 refers to the bulk density of the holding mat 10 placed between the processing structure 20 and the casing 40.

FIG. 15 shows a graph in which the insertion forces (N) shown in FIG. 14 are plotted relative to the bulk density ($g/cm^3$), and FIG. 16 shows a graph in which the post-heating pushing forces (N) shown in FIG. 14 are plotted relative to the bulk density ($g/cm^3$). In FIGS. 15 and 16, the white diamonds indicate the results obtained in Comparative Example 2, and the black squares indicate the results obtained in Example 2.

As shown in FIGS. 14 and 15, the insertion force and the ordinary-state pushing force measured using the gas processing device 1 obtained in Example 2 did not significantly differed from those of Comparative Example 2. As shown in FIGS. 14 and 16, the post-heating pushing force measured using the gas processing device 1 obtained in Example 2 was significantly larger than those of Comparative Example 2.

Specifically, when the bulk density of the holding mat 10 obtained in Example 2 was almost equal to that of Comparative Example 2, the post-heating pushing force measured using the gas processing device 1 obtained in Example 2 was larger than those of Comparative Example 2 by about 20% or more.

It was confirmed by naked eye observation of the gas processing device 1 obtained in Example 2, as in Example 1, that pieces of the alumina fibers forming the holding mat 10 remained on the inner surface 41 of the casing 40 in a bonded state after the casing 40 was separated from the holding mat 10 after heating. Such a phenomenon was not observed in Comparative Example 2.

FIG. 17A shows an example of a scanning electron microscope (SEM) photograph of the inner surface 41 of the casing 40 after the casing 40 was separated from the holding mat 10 after heating. As shown in FIG. 17A, pieces of the alumina fibers forming the holding mat 10 remained on the inner surface 41 of the casing 40 in a bonded state. It is considered that such a phenomenon occurred since the inner surface 41 of the casing 40 made of a metal and the alumina fibers forming the outer surface 11 of the holding mat 10 were strongly bonded through the adhesive layer 12 that was heated and cured.

FIG. 17B shows an example of a scanning electron microscope (SEM) photograph of the inner surface 41 of the casing 40 after the casing 40 was separated from the comparative holding mat obtained in Comparative Example 2. As shown in FIG. 17B, adhesion of the alumina fibers as shown in FIG. 17A was not observed on the inner surface 41 of the casing 40.

In Comparative Example 2, the post-heating pushing force was larger than the ordinary-state pushing force since the organic component bonding the inorganic fibers was lost due to heating, and the inorganic fiber body was restored.

It was thus confirmed that use of the adhesive layer 12 that includes ethyl polysilicate substantially does not increase the frictional resistance (insertion force) during canning, and the frictional resistance between the holding mat 10 and the casing 40 (post-heating pushing force) is significantly increased by heating the adhesive layer 12.

Specifically, it was confirmed that it is possible to effectively prevent removal of the processing structure 20 and the holding mat 10 of the gas processing device 1 without impairing the operability during canning by forming the adhesive layer 12 that includes ethyl polysilicate on the holding mat 10 before canning.

The mechanism by which the above effects were obtained by applying ethyl polysilicate is not clear. For example, it is conjectured that the following chemical reactions occurred. Specifically, hydrolysis of ethyl polysilicate occurs in the ethyl polysilicate aqueous solution (i.e., $Si_5O_4(OC_2H_5)_{12}$ (ethyl polysilicate(pentamer))+$12H_2O$ (water)→$Si_5O_4(OH)_{12}$ (silanol(pentamer))+$12C_2H_5OH$ (ethyl alcohol)). In Example 2, water was used in an amount larger than that required to completely hydrolyze ethyl polysilicate included in the aqueous solution (14.5 g of water based on 100 g of ethyl polysilicate).

A chemical reaction that produces silica from a silanol also occurs due to heating (i.e., $Si_5O_4(OH)_{12}$ (silanol)→$5SiO_2$ (silica)+$6H_2O$ (water)).

It is conjectured that the above chemical reactions occurred at the boundary between the outer surface 11 of the holding mat 10 and the inner surface 41 of the casing 40 to increase the frictional resistance.

EXAMPLE 3

Production of Holding Mat

A mat-like (200 mm×250 mm, thickness: 9 mm) inorganic fiber body having a basis weight of 1350 $g/m^2$ and a bulk density of 0.15 $g/cm^3$ was obtained in the same manner as in Example 1.

In Example 3-1, the inorganic fiber body was cut, and the two largest surfaces (50 mm×50 mm) of the cut inorganic fiber body (within the range of 5 mm from each end) were impregnated with a commercially available silicone oil (1000CS, KF-96, manufactured by Shin-Etsu Chemical Co., Ltd.) to obtain a holding mat 10 on which an adhesive layer 12 including the silicone oil was formed.

In Example 3-2, the inorganic fiber body was cut, the two largest surfaces (50 mm×50 mm) of the cut inorganic fiber body (within the range of 5 mm from each end) were impregnated with a solution (solvent: water and ethanol) of commercially available tetraethoxysilane (ethyl silicate) in the form of ethyl polysilicate (n=4 to 6 (pentamer on average)) (concentration: 4 mass % (silica ($SiO_2$) basis) to for a first adhesive layer, and the above commercially available silicone oil was applied to the first adhesive layer using a brush to obtain a holding mat 10 on which an adhesive layer 12 was formed, the adhesive layer 12 including the first adhesive layer including ethyl polysilicate, and a second adhesive layer stacked on the first adhesive layer and including the silicone oil.

In Comparative Example 3, the inorganic fiber body to which no compound was applied was used as a comparative holding mat.

Evaluation of Frictional Resistance

The coefficient of static friction p before heating and the coefficient of static friction p after heating were evaluated in the same manner as in Example 1. Specifically, the holding mat 10 was held using the tester 50, and the coefficient of static friction (coefficient of static friction before heating) was determined without heating the holding mat 10. The holding mat 10 held by the tester 50 was then heated at 700° C. for 1 hour in an electric furnace (temperature increase rate: 200° C./h), and allowed to cool, and the coefficient of static friction (coefficient of static friction after heating) was determined.

FIG. 18 shows the evaluation results. As shown in FIG. 18, the coefficient of static friction before heating obtained in Examples 3-1 and 3-2 did not significantly differ from that of Comparative Example 3. Specifically, the adhesive layer 12 before heating substantially did not increase the coefficient of static friction between the holding mat 10 and the casing 40.

As shown in FIG. 18, the coefficient of static friction after heating obtained in Examples 3-1 and 3-2 was significantly larger than that of Comparative Example 3. Specifically, the adhesive layer 12 after heating significantly increased the coefficient of static friction between the holding mat 10 and the casing 40.

In Comparative Example 3, the coefficient of static friction after heating was larger than the coefficient of static friction before heating since the surface roughness of stainless steel (SUS) increased due to heating.

It was confirmed by the above results that the adhesive layer 12 according to the invention substantially does not increase the frictional resistance between the holding mat 10 and the casing 40 before the adhesive layer 12 is heated, and significantly increases the frictional resistance between the holding mat 10 and the casing 40 after the adhesive layer 12 has been heated. It was also confirmed that the water resistance of the adhesive layer 12 can be improved by stacking the second adhesive layer that includes a silicone oil on the first adhesive layer that includes ethyl polysilicate.

REFERENCE SIGNS LIST

1: gas processing device, 10: holding mat, 10a: base member, 10b: surface member, 11: outer surface, 12: adhesive layer, 20: processing structure, 30: assembly, 40: casing, 41: inner surface, 50: tester, 51: tensile jig, 52: compression jig, 60: tester, 61: push jig, 62: push rod

The invention claimed is:

1. A gas processing device comprising:

a processing structure;

a metal casing that houses the processing structure; and a holding mat comprising inorganic fibers and located between the processing structure and the casing, the holding mat comprising in a thickness direction thereof extending between the processing structure and the casing:

an outer adhesive layer that comprises a compound that comprises a structural unit represented by a general formula (I), the outer adhesive layer holding the compound on and between the inorganic fibers that form an outer surface of the holding mat and an area around the outer surface,

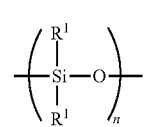

(I)

wherein $R^1$ is independently a hydrogen atom, an alkyl group having 1 to 5 carbon atoms, an alkoxy group having 1 to 5 carbon atoms, a phenyl group, or a hydroxyl group, and n is an integer equal to or larger than 1; and another layer that does not comprise said compound, an inner surface of the casing contacting the outer adhesive layer of the holding mat.

2. The gas processing device according to claim 1, wherein the inner surface of the casing and the holding mat are bonded to each other through the adhesive layer that has been cured.

3. The gas processing device according to claim 1, wherein the inner surface of the casing and the holding mat are bonded to each other via an anchor effect through the adhesive layer.

4. The gas processing device according to claim 1, wherein the inner surface of the casing and the holding mat are bonded to each other so that pieces of the inorganic fibers that form the holding mat remain on the inner surface of the casing in a bonded state when the casing and the holding mat are separated from each other.

5. The gas processing device according to claim 1, wherein the compound is a compound represented by a general formula (II),

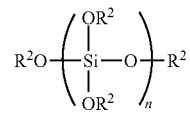

(II)

wherein $R^2$ is independently a hydrogen atom or an alkyl group having 1 to 5 carbon atoms, and n is an integer equal to or larger than 1.

6. The gas processing device according to claim 5, wherein the adhesive layer comprises the compound represented by the general formula (II) wherein at least one $R^2$ is a hydrogen atom to form a hydroxyl group, and a capping compound that protects the hydroxyl group.

7. The gas processing device according to claim 1, wherein the compound is a silicone oil.

8. A gas processing device holding mat comprising inorganic fibers, and to be located between a processing structure and a metal casing in a gas processing device, the casing housing the processing structure, the gas processing device holding mat having an outer surface for coming in contact with an inner surface of the casing, and the holding mat comprising in a thickness direction thereof that extends from the processing structure to the casing when the mat is located between the processing structure and casing:

an adhesive layer, located at at least part of the outer surface, comprising a compound that comprises a structural unit represented by a general formula (I), the adhesive layer holding the compound on and between inorganic fibers that form an outer surface of the holding mat and an area around the outer surface,

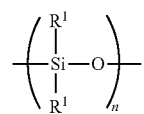
(I)

wherein $R^1$ is independently a hydrogen atom, an alkyl group having 1 to 5 carbon atoms, an alkoxy group having 1 to 5 carbon atoms, a phenyl group, or a hydroxyl group, and n is an integer equal to or larger than 1; and another layer that does not comprise said compound.

* * * * *